(12) United States Patent
Okamoto

(10) Patent No.: US 9,481,162 B2
(45) Date of Patent: Nov. 1, 2016

(54) THREE-DIMENSIONAL SHAPED ARTICLE MANUFACTURING METHOD

(71) Applicant: SEIKO EPSON CORPORATION, Tokyo (JP)

(72) Inventor: Eiji Okamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 89 days.

(21) Appl. No.: 14/574,711

(22) Filed: Dec. 18, 2014

(65) Prior Publication Data

US 2015/0190965 A1 Jul. 9, 2015

(30) Foreign Application Priority Data

Jan. 9, 2014 (JP) .................................. 2014-002681

(51) Int. Cl.
| | |
|---|---|
| *B29C 33/52* | (2006.01) |
| *B29C 71/00* | (2006.01) |
| *B29C 71/02* | (2006.01) |
| *B29C 71/04* | (2006.01) |
| *C09D 11/106* | (2014.01) |

(Continued)

(52) U.S. Cl.
CPC .............. *B33Y 70/00* (2014.12); *B29C 33/448* (2013.01); *B29C 67/0059* (2013.01); *B29C 67/0092* (2013.01); *B33Y 10/00* (2014.12); *B33Y 30/00* (2014.12); *C09D 11/101* (2013.01); *C09D 11/322* (2013.01); *C09D 11/40* (2013.01); *B29K 2105/0005* (2013.01); *B29K 2105/0032* (2013.01); *B29K 2105/0058* (2013.01); *Y10T 428/24802* (2015.01)

(58) Field of Classification Search
CPC . B29C 33/448; B29C 33/52; B29C 67/0055; B29C 67/0059; B29C 67/0081; B29C 67/0092; B29C 71/00; B29C 71/02; B29C 71/04; C09D 11/101; C09D 11/106; C09D 11/107; C09D 11/322; C09D 11/40
USPC ................................ 264/236, 308, 317, 494
See application file for complete search history.

(56) References Cited

U.S. PATENT DOCUMENTS

| | | | |
|---|---|---|---|
| 3,732,107 A | 5/1973 | Faust | |
| 3,857,885 A | 12/1974 | Faust | |

(Continued)

FOREIGN PATENT DOCUMENTS

| | | | |
|---|---|---|---|
| JP | 46-027926 A | 8/1971 | |
| JP | 48-041708 A | 12/1973 | |

(Continued)

*Primary Examiner* — Leo B Tentoni
(74) *Attorney, Agent, or Firm* — Global IP Counselors, LLP

(57) ABSTRACT

A three-dimensional shaped article manufacturing method with which a three-dimensional shaped article having a glossy texture can be manufactured stably and efficiently is provided. A three-dimensional shaped article manufacturing method for manufacturing a three-dimensional shaped article by laminating layers formed by discharging and curing inks including a curable resin, the method including: applying a substantive section-forming ink to a region that forms the three-dimensional shaped article, and applying a sacrificial layer-forming ink for forming a sacrificial layer to a region that is adjacent to a region that forms an outermost layer of the three-dimensional shaped article and on a surface side of the outermost layer, a viscoelasticity of the sacrificial layer-forming ink during curing of the substantive section-forming ink being not less than a viscoelasticity of the substantive section-forming ink during curing of the substantive section-forming ink.

10 Claims, 3 Drawing Sheets

(51) Int. Cl.
*C09D 11/107* (2014.01)
*B33Y 70/00* (2015.01)
*B29C 67/00* (2006.01)
*B33Y 10/00* (2015.01)
*B33Y 30/00* (2015.01)
*B29C 33/44* (2006.01)
*C09D 11/101* (2014.01)
*C09D 11/322* (2014.01)
*C09D 11/40* (2014.01)
*B29K 105/00* (2006.01)

(56) References Cited

U.S. PATENT DOCUMENTS

| | | | |
|---|---|---|---|
| 4,458,006 A | 7/1984 | Doenges et al. | |
| 4,495,271 A | 1/1985 | Geissler et al. | |
| 4,530,747 A | 7/1985 | Donges et al. | |
| 4,987,053 A | 1/1991 | Gersdorf et al. | |
| 5,200,299 A | 4/1993 | Steppan et al. | |
| 5,594,652 A * | 1/1997 | Penn | B29C 67/0059 345/419 |
| 6,612,824 B2 | 9/2003 | Tochimoto et al. | |
| 6,799,959 B1 | 10/2004 | Tochimoto et al. | |
| 2002/0079601 A1* | 6/2002 | Russell | B29C 67/0081 264/308 X |
| 2010/0007692 A1* | 1/2010 | Vanmaele | B29C 67/0055 347/21 |
| 2010/0256255 A1* | 10/2010 | Stevens | C09D 11/101 522/182 |
| 2010/0302300 A1* | 12/2010 | Verdonck | C09D 11/101 347/17 |
| 2015/0217516 A1* | 8/2015 | Yakubov | B29C 67/0055 264/401 |
| 2015/0352783 A1* | 12/2015 | Snyder | B29C 67/0059 264/132 |

FOREIGN PATENT DOCUMENTS

| | | |
|---|---|---|
| JP | 51-047334 B | 12/1976 |
| JP | 54-021726 B | 8/1979 |
| JP | 57-196231 A | 12/1982 |
| JP | 59-005240 A | 1/1984 |
| JP | 59-005241 A | 1/1984 |
| JP | 01-165613 A | 6/1989 |
| JP | 02-226149 A | 9/1990 |
| JP | 2000-280354 A | 10/2000 |
| JP | 2001-150556 A | 6/2001 |
| JP | 2011-073163 A | 4/2011 |

* cited by examiner

THREE-DIMENSIONAL SHAPED ARTICLE MANUFACTURING METHOD

CROSS-REFERENCE TO RELATED APPLICATIONS

This application claims priority to Japanese Patent Application No. 2014-002681 filed on Jan. 9, 2014. The entire disclosure of Japanese Patent Application No. 2014-002681 is hereby incorporated herein by reference.

BACKGROUND

1. Technical Field

The present invention relates to a three-dimensional shaped article manufacturing method, a three-dimensional shaped article manufacturing apparatus, an ink set, and a three-dimensional shaped article.

2. Related Art

Conventionally known is a method of forming a three-dimensional shaped article on the basis of a model of a three-dimensional object generated with, for example, three-dimensional computer-aided design (CAD) software or the like.

A lamination method is one known method of forming a three-dimensional shaped article. A lamination method generally comprises forming the three-dimensional shaped article by dividing the model of the three-dimensional object into a large number of two-dimensional cross-sectional layers and thereafter sequentially laminating cross-sectional members corresponding to each of the two-dimensional cross-sectional layers while the cross-sectional members are also being sequentially shaped.

The lamination method makes it possible to immediately form any model of a three-dimensional shaped article intended to be shaped, and is free of such needs as creating a mold prior to the shaping, and therefore makes it possible to form a three-dimensional shaped article both quickly and inexpensively. Also, the three-dimensional shaped article is formed by laminating the cross-sectional members, which are thin and plate-shaped, one layer at a time, and therefore it is possible to form even a complex object having, for example, an internal structure as an integrated shaped article without dividing the object into a plurality of components.

One known form of such a lamination method is a technique for shaping the three-dimensional shaped article while also fixing a powder with a binding solution (see JP-A-2001-150556 (patent document 1), for example). With the technique of such description, the formation of each of the layers entails imparting color to the three-dimensional shaped article by discharging an ink comprising a coloring agent onto a location corresponding to an outer surface side of the three-dimensional shaped article.

However, with the conventional methods, an unintended wrinkling is generated irregularly, and it is difficult to render a glossy texture.

SUMMARY

Aspects of the present invention are to provide a three-dimensional shaped article manufacturing method with which a three-dimensional shaped article having a glossy texture can be manufactured stably and efficiently, to provide a three-dimensional shaped article manufacturing apparatus with which a three-dimensional shaped article having a glossy texture can be manufactured stably and efficiently, to provide an ink set that can be used in order to stably and efficiently manufacture a three-dimensional shaped article having a glossy texture, and to provide a three-dimensional shaped article having a glossy texture.

Such aspects are achieved by the present invention described below.

A three-dimensional shaped article manufacturing method of the present invention is a method for manufacturing a three-dimensional shaped article by laminating layers formed by discharging and curing inks including a curable resin, the method including: applying a substantive section-forming ink to a region that forms the three-dimensional shaped article; and applying a sacrificial layer-forming ink for forming a sacrificial layer to a region that is adjacent to a region that forms an outermost layer of the three-dimensional shaped article and on a surface side of the outermost layer, a viscoelasticity of the sacrificial layer-forming ink during curing of the substantive section-forming ink being not less than a viscoelasticity of the substantive section-forming ink during curing of the substantive section-forming ink.

This makes it possible to provide a three-dimensional shaped article manufacturing method by which a three-dimensional shaped article having a glossy texture can be manufactured stably and efficiently.

The three-dimensional shaped article manufacturing method of the present invention, preferably, includes removing the sacrificial layer from a provisional molded article obtained by curing the substantive section-forming ink and the sacrificial layer-forming ink.

This makes it possible for an observer to more suitably view a surface state where an unintended wrinkling has not been generated, because the substantive section is exposed in the three-dimensional shaped article that is ultimately obtained. For this reason, the effects of the present invention are more prominently exhibited.

In the three-dimensional shaped article manufacturing method of the present invention, preferably, the sacrificial layer-forming ink includes 2-(2-vinyloxyethoxy)ethyl (meth)acrylate.

This makes it possible to cure the sacrificial layer-forming ink at a more appropriate speed of curing, causes the glossy outer appearance to be more reliably obtained in the three-dimensional shaped article, and makes it possible to provide the three-dimensional shaped article with particularly excellent productivity.

In the three-dimensional shaped article manufacturing method of the present invention, preferably, the sacrificial layer-forming ink includes polyethylene glycol di(meth)acrylate, in addition to 2-(2-vinyloxyethoxy)ethyl(meth)acrylate.

This makes it possible to cure the sacrificial layer-forming ink at an even more appropriate speed of curing, causes the glossy outer appearance to be more reliably obtained in the three-dimensional shaped article, and makes it possible to provide the three-dimensional shaped article with particularly excellent productivity.

In the three-dimensional shaped article manufacturing method of the present invention, preferably, the substantive section-forming ink includes one or more species selected from the group consisting of 2-(2-vinyloxyethoxy)ethyl (meth)acrylate, polyether-based aliphatic urethane(meth)acrylate oligomer, 2-hydroxy-3-phenoxypropyl(meth)acrylate, and 4-hydroxybutyl(meth)acrylate.

This makes it possible to cure the substantive section-forming ink at a more appropriate speed of curing, causes the glossy outer appearance to be more reliably obtained in the three-dimensional shaped article, and makes it possible to provide the three-dimensional shaped article with particularly excellent productivity.

In the three-dimensional shaped article manufacturing method of the present invention, preferably, the substantive section-forming ink and the sacrificial layer-forming ink both include bis(2,4,6-trimethylbenzoyl)-phenyl phosphineoxide and/or 2,4,6-trimethylbenzoyl-diphenyl-phosphineoxide as a polymerization initiator.

This makes it possible to cure the substantive section-forming ink and the sacrificial layer-forming ink at a more appropriate speed of curing, causes the glossy outer appearance to be more reliably obtained in the three-dimensional shaped article, and makes it possible to provide the three-dimensional shaped article with particularly excellent productivity.

In the three-dimensional shaped article manufacturing method of the present invention, preferably, a color ink containing a coloring agent and, in addition thereto, a colorless ink not containing a coloring agent are used as the substantive section-forming ink, the colorless ink being used upon formation of the region that forms the outermost layer, and the color ink being used upon formation of a region that is inside therefrom.

This makes it possible to more suitably render the glossy texture.

In the three-dimensional shaped article manufacturing method of the present invention, preferably, a chromatic color ink and a white ink are used as a color ink containing a coloring agent, the white ink being used upon formation of a region inside of a region formed using the chromatic color ink.

This makes it possible for the region (a first region) to which the white ink is applied to exhibit masking, and makes it possible to further raise the chroma of the three-dimensional shaped article.

In the three-dimensional shaped article manufacturing method of the present invention, preferably, a plurality of different types of the sacrificial layer-forming ink are used.

This makes it possible, for example, for the three-dimensional shaped article that is ultimately obtained to have a plurality of regions at which the degree of glossiness is different. As a result, it becomes possible to render a more complex outer appearance, and the three-dimensional shaped article can be given a particularly excellent aesthetic appearance (aesthetics), luxuriousness, and the like.

In the three-dimensional shaped article manufacturing method of the present invention, preferably, the sacrificial layer-forming ink is selectively applied only to a part of the region that is adjacent to the region that forms an outermost layer of the three-dimensional shaped article and on the surface side of the outermost layer.

This causes the three-dimensional shaped article that is ultimately obtained to be one where a site that presents with a glossy texture and a site that presents with another kind of texture both exist, thus making it possible to render more complex outer appearances and making it possible to give the three-dimensional shaped article a particularly excellent aesthetic appearance (aesthetics), luxuriousness, and the like.

A three-dimensional shaped article manufacturing apparatus of the present invention is for manufacturing a three-dimensional shaped article by laminating layers formed by discharging and curing inks including a curable resin, the apparatus comprising: a first discharge unit configured to discharge a substantive section-forming ink to a region that forms the three-dimensional shaped article; a second discharge unit configured to discharge a sacrificial layer-forming ink for forming a sacrificial layer to a region that is adjacent to a region that forms an outermost layer of the three-dimensional shaped article and on a surface side of the outermost layer; and a curing unit configured to cure the substantive section-forming ink and the sacrificial layer-forming ink, a viscoelasticity of the sacrificial layer-forming ink during curing of the substantive section-forming ink being not less than a viscoelasticity of the substantive section-forming ink during curing of the substantive section-forming ink.

This makes it possible to provide a three-dimensional shaped article manufacturing apparatus by which a three-dimensional shaped article having a glossy texture can be manufactured stably and efficiently.

An ink set of the present invention is used for manufacturing a three-dimensional shaped article by laminating layers formed by discharging and curing inks including a curable resin, the ink set comprising: a substantive section-forming ink applied to a region that forms the three-dimensional shaped article; and a sacrificial layer-forming ink applied to a region that is adjacent to a region that forms an outermost layer of the three-dimensional shaped article and on a surface side of the outermost layer, a viscoelasticity of the sacrificial layer-forming ink during curing of the substantive section-forming ink being not less than a viscoelasticity of the substantive section-forming ink during curing of the substantive section-forming ink.

This makes it possible to provide an ink set by which a three-dimensional shaped article having a glossy texture can be manufactured stably and efficiently.

A three-dimensional shaped article of the present invention is manufactured using the three-dimensional shaped article manufacturing method of the present invention.

This makes it possible to provide a three-dimensional shaped article having a glossy texture.

A three-dimensional shaped article of the present invention is manufactured using the three-dimensional shaped article manufacturing apparatus of the present invention.

This makes it possible to provide a three-dimensional shaped article having a glossy texture.

A three-dimensional shaped article of the present invention is manufactured using the ink set of the present invention.

This makes it possible to provide a three-dimensional shaped article having a glossy texture.

BRIEF DESCRIPTION OF THE DRAWINGS

Referring now to the attached drawings which form a part of this original disclosure.

DETAILED DESCRIPTION OF EMBODIMENTS

Figure 1A:
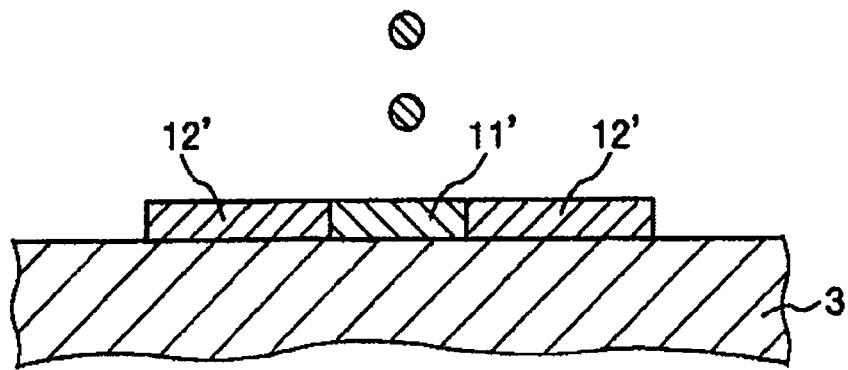
FIGS. 1A to 1H are cross-sectional views schematically illustrating respective steps as regards a preferred embodiment of a method of manufacturing a three-dimensional shaped article of the present invention.

Preferred embodiments of the present invention shall now be described in greater detail below, with reference to the accompanying drawings.

<<Method of Manufacturing a Three-dimensional Shaped Article>>

First, a method of manufacturing a three-dimensional shaped article in the present invention shall be described.

FIGS. 1A to 1H are cross-sectional views schematically illustrating respective steps as regards a preferred embodiment of a method of manufacturing a three-dimensional shaped article of the present invention.

As illustrated in FIGS. 1A to 1H, a method of manufacturing a three-dimensional shaped article 10 of the present embodiment comprises: ink discharge steps (FIGS. 1A, 1C, 1E) in which a substantive section-forming ink (first ink) 11' comprising a curable resin and a sacrificial layer-forming ink (second ink) 12' comprising a curable resin are discharged in a predetermined pattern by inkjet; curing steps (FIGS. 1B, 1D, 1F) in which a layer 1 including a substantive section 11 and a sacrificial layer 12 is formed by curing the discharged substantive section-forming ink 11' and sacrificial layer-forming ink 12; these steps being sequentially repeated to obtain a provisional molded article 10' (FIG. 1O), and thereafter a sacrificial layer removal step (FIG. 1H) in which the sacrificial layers 12 are removed.

In the ink discharge steps, the substantive section-forming ink 11' is applied to a region that is to become the substantive section 11 of the three-dimensional shaped article 10, and the sacrificial layer-forming ink 12' is applied to a region which is adjacent to a region that is to become an outermost layer of the substantive section 11 of the three-dimensional shaped article 10 and which is on the surface side of the outermost layer.

The viscoelasticity of the sacrificial layer-forming ink 12' during curing of the substantive section-forming ink 11' is not less than the viscoelasticity of the substantive section-forming ink 11' during curing of the substantive section-forming ink 11'. "During curing" refers to a semi-cured state at a point in time where the fluidity is lost when the substantive section-forming ink 11' is being cured.

Satisfying such conditions prevents an unintended wrinkling from occurring at a site that is to become an outer surface of the substantive section 11 when the substantive section-forming ink 11' is being cured, and causes the three-dimensional shaped article 10 that is ultimately obtained to have a glossy outer appearance. Satisfying the aforementioned conditions also makes it possible to stably and efficiently manufacture the three-dimensional shaped article 10.

It suffices for the viscoelasticity of the sacrificial layer-forming ink 12' during curing of the substantive section-forming ink 11' to not be less than the viscoelasticity of the substantive section-forming ink 11' during curing of the substantive section-forming ink 11', but preferably the viscoelasticity of the sacrificial layer-forming ink 12' during curing of the substantive section-forming ink 11' is greater than the viscoelasticity of the substantive section-forming ink 11' during curing of the substantive section-forming ink 11'. This causes the effects of the present invention to be more prominently exhibited.

In the present invention, it is possible to employ a value obtained by measurement using a variety of viscoelasticity measurement instruments (for example, ARES by Rheometric Scientific, or the like) as the viscoelasticity, but it would also be possible to determine the relationship between the viscoelasticities of the two inks without actually measuring the viscosity during curing of the substantive section-forming ink, from, for example, the relationship between the initial viscosities (the viscosities in the state prior to when the curing reaction is allowed to proceed) of the substantive section-forming ink and the sacrificial layer-forming ink, the relationship between the degrees of curing of the two inks after the substantive section-forming ink and the sacrificial layer-forming ink have been subjected to the curing treatment under the same conditions, or the like.

Each of the steps shall now be described below.

<<Ink Discharge Steps (Ink Application Steps)>>

Figure 1B:
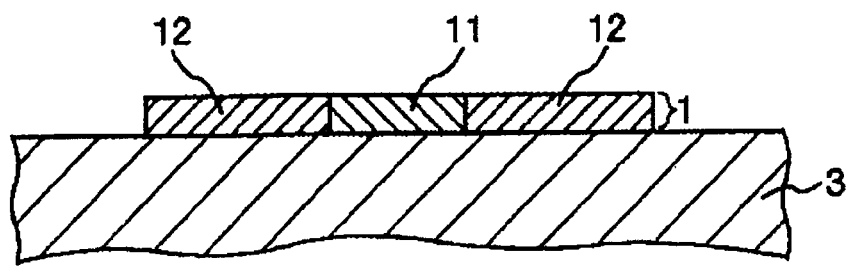
Figure 1C:
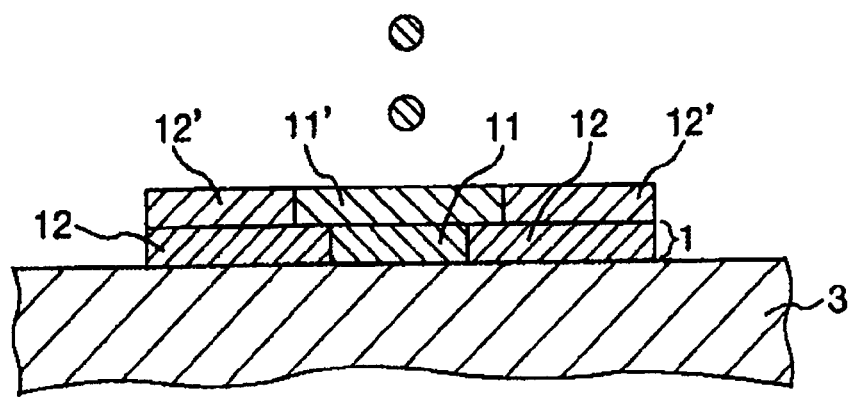
Figure 1D:
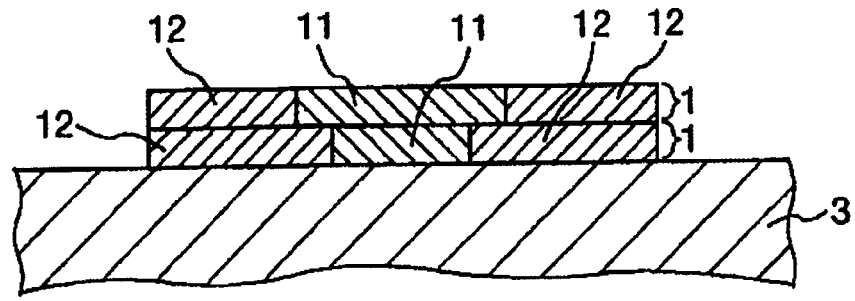
Figure 1E:
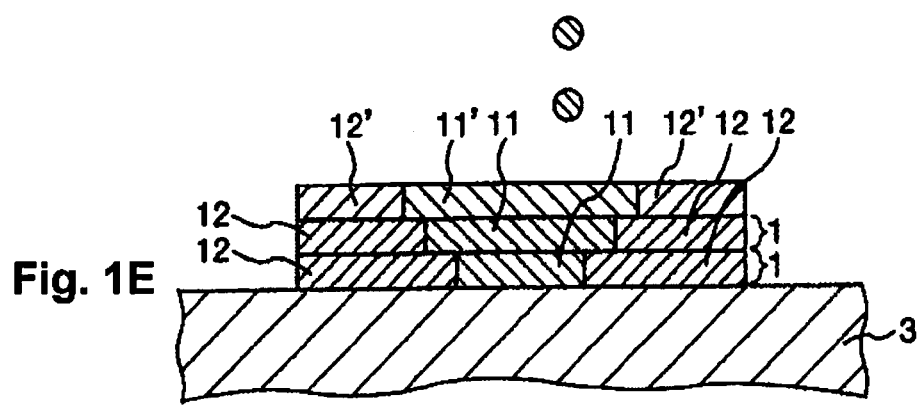

In the ink discharge steps, the substantive section-forming ink 11' comprising a curable resin and the sacrificial layer-forming ink 12' comprising a curable resin are discharged in a predetermined pattern by inkjet (FIGS. 1A, 1C, 1E).

More specifically, the substantive section-forming ink 11' is applied to a region that is to become the substantive section 11 of the three-dimensional shaped article 10, and the sacrificial layer-forming ink 12' is applied to a region which is adjacent to a region that is to become an outermost layer of the substantive section 11 of the three-dimensional shaped article 10 and which is on the surface side of the outermost layer.

In the first of the ink discharge steps, the inks (the substantive section-forming ink 11' and the sacrificial layer-forming ink 12') are discharged onto a stage 3 (FIG. 1A), and in the second and subsequent ink discharge steps, the inks (the substantive section-forming ink 11' and the sacrificial layer-forming ink 12') are discharged onto a layer 1 (FIGS. 1C, 1E).

In this manner, in the present embodiment, not only is ink (the substantive section-forming ink 11') applied to the site that is to become the substantive section 11 of the three-dimensional shaped article 10, but also ink (the sacrificial layer-forming ink 12') is applied to the surface side thereof, as well.

So doing adjusts the surface shape of the three-dimensional shaped article 10 and in particular prevents an unintended wrinkling from being generated, thus producing a surface shape that presents with a glossy outer appearance.

Applying the sacrificial layer-forming ink 12' and forming the sacrificial layer 12 makes it possible for the substantive section-forming ink 11' for forming an upper layer (second layer) to be suitably supported by the sacrificial layer of a lower layer (first layer), even for where a layer (second layer) constituting the three-dimensional shaped article 10 has a portion bulging out from an outer peripheral section of the layer (first layer) therebelow (for example, the relationship between the first layer and second layer from the bottom, the relationship between the second layer and third layer from the bottom, and the relationship between the fourth layer and fifth layer from the bottom in the drawings). Therefore, unintended deformation (in particular, sagging and the like) of the substantive section 11 can be suitably prevented (the sacrificial layer 12 of the first layer functions as a support material), and the three-dimensional shaped article 10 that is ultimately obtained can be given particularly excellent dimensional accuracy.

In the present steps, the inks (the substantive section-forming ink 11' and the sacrificial layer-forming ink 12') are applied by inkjet, and therefore the inks can be applied with favorable reproducibility even when the pattern of application of the inks (the substantive section-forming ink 11' and the sacrificial layer-forming ink 12') has a finely-detailed shape. As a result, the three-dimensional shaped article 10 that is ultimately obtained can be given particularly high dimensional accuracy, and also the surface shape and appearance of the three-dimensional shaped article 10 can be more suitably controlled.

The substantive section-forming ink 11' and the sacrificial layer-forming ink 12' shall be described in greater detail below.

Though the amount of ink applied in the present steps is not particularly limited, the thickness of the first layer formed in the subsequent curing step is preferably 30 to 500 μm, more preferably 70 to 150 μm.

This makes it possible to more effectively prevent, inter alia, the occurrence of unintended irregularities in the three-dimensional shaped article 10 that is manufactured, while also giving the three-dimensional shaped article 10 ample and excellent productivity, and makes it possible to give the three-dimensional shaped article 10 particularly excellent dimensional accuracy. The surface state and appearance of the three-dimensional shaped article 10 that is ultimately obtained can also be more suitably controlled.

<<Curing Steps (Layer Formation Steps)>>

Figure 1F:
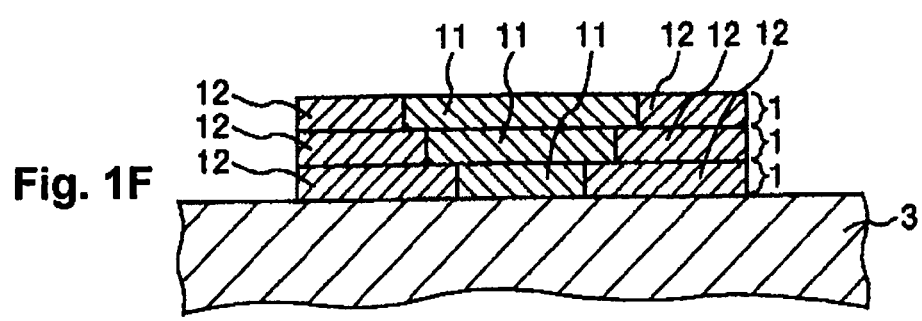
Figure 1G:
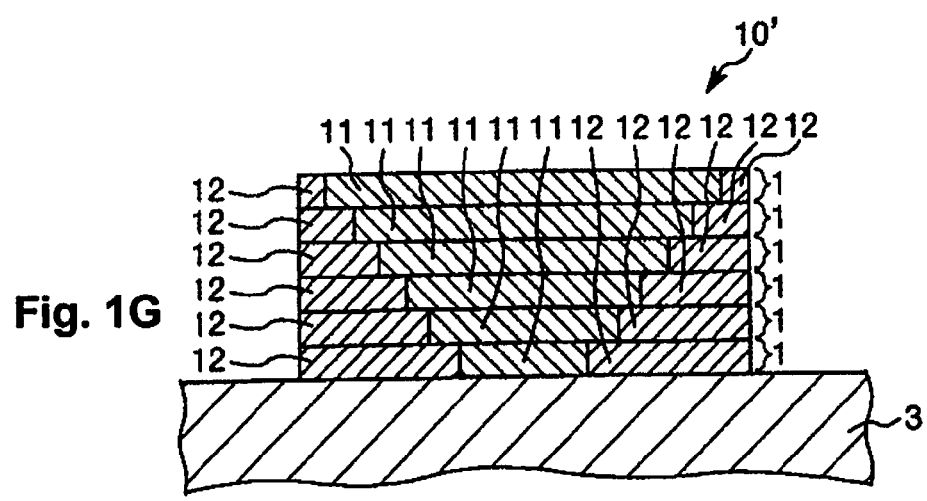

After the inks (the substantive section-forming ink 11' and the sacrificial layer-forming ink 12') have been applied (discharged) in the ink discharge steps, the curing components (curable resins) included in the inks (the substantive section-forming ink 11' and the sacrificial layer-forming ink 12') are cured (FIGS. 1B, 1D, 1F). This produces the layer 1 having the substantive section 11 and the sacrificial layer 12.

The viscoelasticity of the substantive section-forming ink 11' and the viscoelasticity of the sacrificial layer-forming ink 12' when the substantive section-forming ink 11' and the sacrificial layer-forming ink 12' are being cured in the present steps (the instant where the substantive section-forming ink 11' is cured) satisfy a predetermined relationship. Namely, the viscoelasticity of the sacrificial layer-forming ink 12' during curing of the substantive section-forming ink 11' is not less than the viscoelasticity of the substantive section-forming ink 11' during curing of the substantive section-forming ink 11'.

This makes it possible for the sacrificial layer-forming ink 12' to be prevented from moving microscopically during curing, and makes it possible to prevent an unintended wrinkling from being generated in the surface (site where the substantive section-forming ink 11' has been in contact with the sacrificial layer-forming ink 12') of the substantive section 11 due to the stress during curing. As a result, the three-dimensional shaped article 10 that is ultimately obtained is prevented from experiencing an unintended wrinkling, has a smooth surface, and presents with a glossy outer appearance.

Also, adjusting the duration from landing of the inks until completion of curing (for example, the intensity of irradiation with energy rays, or the like) makes it possible to easily and reliably control the extent of the glossiness. As a result, the three-dimensional shaped article 10 that is ultimately obtained can be reliably given a desired appearance.

Also, curing the curing components (curable resins) included in the inks in the present steps causes the three-dimensional shaped article 10 that is ultimately obtained to be constituted of a cured article, and therefore to have more excellent mechanical strength, durability, and the like than a three-dimensional shaped article constituted of, for example, a thermoplastic resin or the like.

The present steps vary depending on the types of curing components (curable resins), but, for example, in a case where the curing components (curable resins) are heat-curable resins, the present steps can be carried out by heating; in a case where the curing components (curable resins) are photocurable resins, the present steps can be carried out by irradiating with a corresponding light (for example, the present steps can be carried out by irradiating with ultraviolet rays in a case where the curing components (curable resins) are ultraviolet-curable resins).

The description above posits applying the inks in a shape and pattern corresponding to the layer 1 and thereafter curing the entirety of the layer (layer corresponding to layer 1) constituted of the inks, but in the present invention, the discharging of ink and the curing of ink may also proceed simultaneously for at least a partial region. That is to say, prior to when the entirety of the pattern of the entirety of one layer 1 is formed, the curing reaction may be allowed to proceed sequentially from a site to which the inks were applied as regards at least a part of the region corresponding to the layer 1. As regards at least a portion of contact between the substantive section-forming ink 11' and the sacrificial layer-forming ink 12' (a portion at which the substantive section 11 and the sacrificial layer 12 are to be in contact), however, the curing treatment (for example, curing with ultraviolet rays, in a case where the curing components included in the two inks are ultraviolet-curable resins) would be carried out at the same time, and the curing treatment for the substantive section-forming ink 11' and the curing treatment for the sacrificial layer-forming ink 12' would not be performed separately.

Also, in the present steps, there is no need to completely cure the curing components included in the inks. For example, at the end of the present steps, the sacrificial layer-forming ink 12' may have achieved an incompletely cured state, the substantive section-forming ink 11' having been cured at a higher degree of cure than the sacrificial layer-forming ink 12'.

This makes it possible to easily perform the sacrificial layer removal step described below, and makes it possible to further improve the productivity of the three-dimensional shaped article 10.

At the end of the present steps, also, a state where the substantive section-forming ink 11' has been cured in an incomplete state may also be achieved. In such a case, too, the three-dimensional shaped article 10 that is ultimately obtained can be given excellent mechanical strength and the like by, for example, carrying out a true curing step for raising the degree of cure with respect to the substantive section-forming ink 11' (the substantive section 11) that is in the incomplete curing state after having carried out a later step (for example, the "ink discharge step" that follows formation of the underlying layer 1 in the curing steps, or the like). Also, applying the ink for forming an upper layer in the state where the substantive section-forming ink 11' (lower layer) has been cured in the incomplete state makes it possible to impart particularly excellent adhesion between the layers.

The aforementioned sequence of steps is repeatedly carried out. This achieves a state where the layers 1 adjacent to one another are bonded together, and produces a laminate in which a plurality of the layers 1 in such a state have been laminated, i.e., the provisional molded article 10' in which the sacrificial layers 12 are provided to the surfaces of the substantive sections 11 (see FIG. 1G).

<<Sacrificial Layer Removal Step>>

Figure 1H:
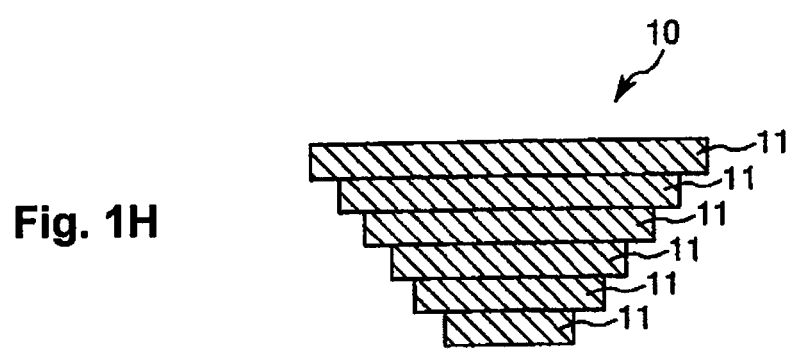

After the aforementioned sequence of steps has been repeatedly carried out, the sacrificial layers 12 are removed (FIG. 1H).

This produces a three-dimensional shaped article 10 on which the flat-surfaced substantive section 11, where no unintended wrinkling has been generated, is exposed. This three-dimensional shaped article 10 has a glossy texture.

Examples of methods of removing the sacrificial layers could include a method with which a liquid that selectively dissolves the sacrificial layers 12 is used to selectively dissolve and remove the sacrificial layers 12; or a method with which a liquid that has higher absorption by the sacrificial layers 12 than the substantive section 11 is used to cause the liquid to be selectively absorbed into the sacrificial layers 12, thereby expanding the sacrificial layers 12, or lowering the mechanical strength of the sacrificial layers 12 whereupon the sacrificial layers 12 are peeled off or destroyed.

The liquid used in the present step would vary depending on the constituent materials of the substantive section 11 and the sacrificial layers 12, and the like, but examples that could be used include: water; methanol, ethanol, isopropyl alcohol, n-propyl alcohol, butanol, isobutanol, and other alcohols; or glycerin, ethylene glycol, diethylene glycol, triethylene glycol, propylene glycol, dipropylene glycol, and other glycols. The liquid may comprise one or more species selected from these, and may also have: a water-soluble substance that produces hydroxide ions of sodium hydroxide, potassium hydroxide, sodium hydrogen carbonate, or organic amines in order to improve the dissolubility of the sacrificial layers; a surfactant that facilitates separation of the sacrificial layers that have been peeled off; or the like that is mixed therein.

Though not particularly limited, examples of the method of applying the aforementioned liquid to the provisional molded article 10' could include employing a variety of methods such as immersion, spraying, or coating.

The description above posits that a liquid is used, but a substance (for example, a solid, gas, supercritical fluid, or the like) that has a similar function may also be used.

Ultrasonic vibrations may also be applied when the liquid is being applied or after the liquid has been applied.

This makes it possible to facilitate the removal of the sacrificial layers 12 and makes it possible to give the three-dimensional shaped article 10 particularly excellent productivity.

In the present invention, the surface state (flat surface state where no unintended wrinkling has been generated) of the substantive section 11 of the three-dimensional shaped article 10 can be viewed in the state of the provisional molded article 10'; in a case where a glossy outer appearance is presented, the sacrificial layers 12 need not be removed, but removing the sacrificial layers 12 as in the present embodiment makes it possible for the flat surface state where no unintended wrinkling has been generated to be suitably viewed by an observer, because the substantive section 11 is exposed. For this reason, the effects of the present invention are more prominently exhibited.

The description above posits that the sacrificial layer-forming ink 12' is applied so as to be in contact with the substantive section-forming ink 11' in the entire region that is to become the outermost layer of the three-dimensional shaped article 10, but the sacrificial layer-forming ink 12' may instead be applied so as to be in contact with the substantive section-forming ink 11' only in a part of the region that is to become the outermost layer of the three-dimensional shaped article 10.

This causes the three-dimensional shaped article 10 that is ultimately obtained to be one where a site that presents with a glossy texture and a site that presents with another kind of texture both exist, thus making it possible to render more complex outer appearances and making it possible to give the three-dimensional shaped article 10 a particularly excellent aesthetic appearance (aesthetics), luxuriousness, and the like.

According to the method of manufacture of the present invention as described above, a three-dimensional shaped article that has a glossy texture can be manufactured stably and efficiently. Also, the yield of the three-dimensional shaped article is improved and therefore the present invention is also advantageous in terms of reducing the costs of manufacturing the three-dimensional shaped article.

<<Apparatus for Manufacturing a Three-dimensional Shaped Article>>

First, the apparatus for manufacturing a three-dimensional shaped article of the present invention shall be described.

Figure 2:
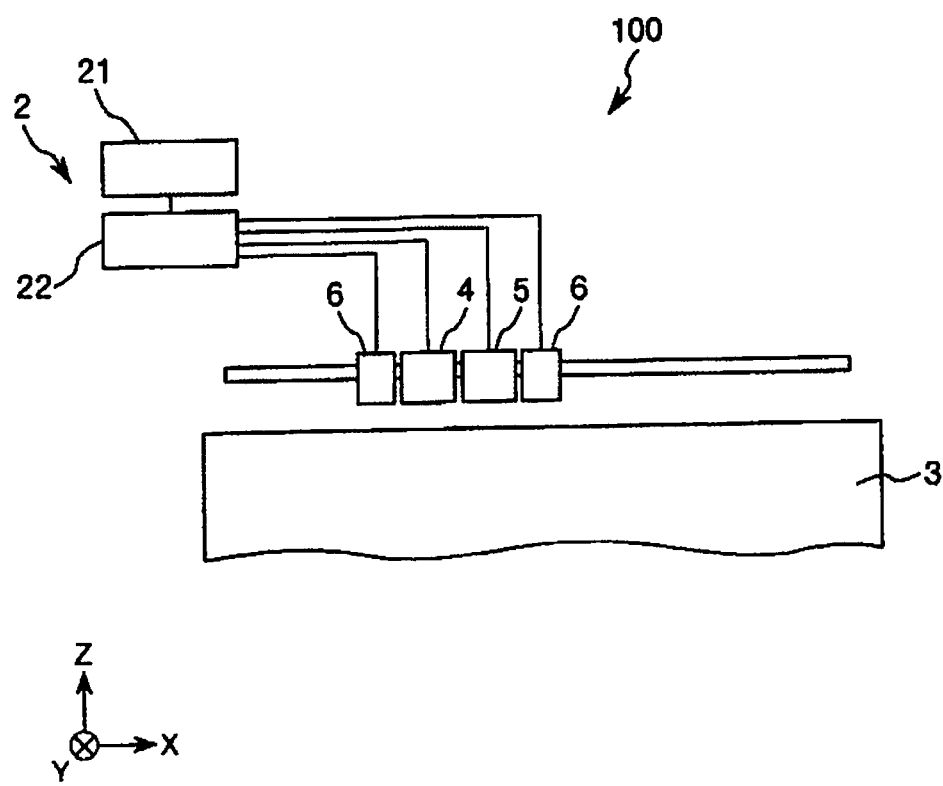
FIG. 2 is a cross-sectional view schematically illustrating a preferred embodiment of an apparatus for manufacturing a three-dimensional shaped article of the present invention.

FIG. 2 is a cross-sectional view schematically illustrating a preferred embodiment of an apparatus for manufacturing a three-dimensional shaped article of the present invention.

An apparatus 100 for manufacturing a three-dimensional shaped article is one that manufactures the three-dimensional shaped article 10 by using the substantive section-forming ink 11' and the sacrificial layer-forming ink 12' to repeatedly mold and laminate the layers 1.

As illustrated in FIG. 2, the apparatus 100 for manufacturing a three-dimensional shaped article has: a control unit 2; the stage 3; a first ink discharge unit (substantive section-forming ink applying means) 4 for discharging the substantive section-forming ink 11; a second ink discharge unit (sacrificial layer-forming ink applying means) 5 for discharging the sacrificial layer-forming ink 12', and an energy ray irradiating means (curing means) 6 for irradiating with energy rays for curing the substantive section-forming ink 11' and the sacrificial layer-forming ink 12'.

The control unit 2 has a computer 21 and a drive control unit 22.

The computer 21 is, inter alia, a common desktop computer configured to be provided with a CPU, memory, and the like inside. The computer 21 converts the shape of the three-dimensional shaped article 10 into data in the form of the model data, which is then sliced into many parallel layers of thin cross-sections to obtain cross-sectional data (slice data) that is then outputted to the drive control unit 22.

The drive control unit 22 functions as a controlling means for respectively driving the first ink discharge unit (substantive section-forming ink applying means) 4, the second discharge unit (sacrificial layer-forming ink applying means) 5, the energy ray irradiating means (curing means) 6, and the like. A more specific example of what is controlled is the discharged pattern and discharged amount of the substantive section-forming ink 11' from the first ink discharge unit (substantive section-forming ink applying means) 4, the discharged pattern and discharged amount of the sacrificial layer-forming ink 12' from the second discharge unit (sacrificial layer-forming ink applying means) 5, the irradiated amount and irradiation timing of the energy rays from the energy ray irradiating means (curing means) 6, and the like.

The stage 3 is a region where the substantive section-forming ink 11' and the sacrificial layer-forming ink 12' are applied.

The stage 3 is one that has a flat surface (the site where the substantive section-forming ink 11' and the sacrificial layer-forming ink 12' are applied).

This makes it possible to easily and reliably form layers 1 that have a highly uniform thickness. It is also possible to effectively prevent unintended deformation or the like from taking place in the three-dimensional shaped article 10 that is manufactured.

The stage 3 is preferably constituted of a high-strength material. Examples of the constituent material of the stage 3 include a variety of metal materials such as stainless steel.

The surface (site where the substantive section-forming ink 11' and the sacrificial layer-forming ink 12' are applied) of the stage 3 may also be subjected to a surface treatment.

This makes it possible, for example, to more effectively prevent the constituent material of the substantive section-forming ink 11' and the constituent material of the sacrificial layer-forming ink 12' from adhering to the stage 3, to give the stage 3 excellent durability, to achieve production of the three-dimensional shaped article 10 that has long-term stability, and so forth. Examples of the material used for the surface treatment of the surface of the stage 3 could include a fluorine resin such as polytetrafluoroethylene, or the like.

The first ink discharge unit (substantive section-forming ink applying means) 4 is one that discharges the substantive section-forming ink 11' by inkjet.

Providing such a first ink discharge unit (substantive section-forming ink applying means) 4 makes it possible to apply a desired amount of the substantive section-forming ink 11' to a desired site with a finely-detailed pattern, and makes it possible to manufacture even the three-dimensional shaped article 10, which has a finely-detailed structure, at particularly favorable productivity.

For the liquid droplet discharge format (inkjet format), it would be possible to use a piezoelectric format, a format for discharging the ink using bubbles generated by heating the ink, or the like, but a piezoelectric format is preferable in terms of the difficulty of altering the constituent components of the ink and the like.

With the first ink discharge unit (substantive section-forming ink applying means) 4, a command coming from the drive control unit 22 controls the pattern that is to be formed, the amount of substantive section-forming ink 11' applied, and the like. The discharged pattern, discharged amount, and the like of the substantive section-forming ink 11' from the first ink discharge unit (substantive section-forming ink applying means) 4 are determined on the basis of the slice data.

This makes it possible to apply a necessary and sufficient amount of the substantive section-forming ink 11' to a target site, makes it possible to reliably form the substantive section 11 of the desired pattern, and makes it possible to give the three-dimensional shaped article 10 more reliably excellent dimensional accuracy and mechanical strength. Also, in a case where the substantive section-forming ink 11' is one that comprises a coloring agent, then the desired color tone, patterning, and the like can be obtained.

The first ink discharge unit (substantive section-forming ink applying means) 4 has the ability to move in the X-direction and the Y-direction relative to the stage, and also has the ability to move in the Z-direction.

This makes it possible to uphold the desired value of distance between a nozzle surface (discharge unit distal end) of the first ink discharge unit (substantive section-forming ink applying means) 4 and a section of landing of the substantive section-forming ink 11' even in a case where the layers 1 have been laminated.

The second ink discharge unit (sacrificial layer-forming ink applying means) 5 is one that discharges the sacrificial layer-forming ink 12' by inkjet.

Providing such a second ink discharge unit (sacrificial layer-forming ink forming ink applying means) 5 makes it possible to apply a desired amount of the sacrificial layer-forming ink 12' to a desired site with a finely-detailed pattern, and makes it possible, even when the three-dimensional shaped article 10 that is to be manufactured has a finely-detailed structure, to form sacrificial layers 12 of the desired size and shape at the desired shapes, thus making it possible to more reliably form the surface shape and outer appearance of the three-dimensional shaped article 10. It is also possible to give the three-dimensional shaped article 10 particularly excellent productivity.

The format of ink droplet discharge (inkjet format), control, driving, and the like as regards the second ink discharge unit (sacrificial layer-forming ink applying means) 5 are similar to those described above for the first ink discharge unit (substantive section-form ing ink applying means) 4.

The energy ray irradiating means (curing means) 6 is one that irradiates with energy rays for curing the substantive section-forming ink 11' and the sacrificial layer-forming ink 12'.

Providing the curing means 6 of such description makes it possible to give the three-dimensional shaped article 10 that is ultimately obtained excellent mechanical strength and also makes it possible to reliably control the surface shape and outer appearance of the three-dimensional shaped article 10.

The energy ray irradiating means (curing means) 6 is one that has an irradiation surface area that allows for the substantive section-forming ink 11' and the sacrificial layer-forming ink 12' to be irradiated with the energy rays at the same time, as regards at least the portion of contact between the substantive section-forming ink 11' and the sacrificial layer-forming ink 12' (the portion at which the substantive section 11 and the sacrificial layer 12 are to be in contact with one another).

The type of energy rays with which the energy ray irradiating means (curing means) 6 irradiates will vary depending on the constituent materials of the substantive section-forming ink 11' and the sacrificial layer-forming ink 12', but examples include ultraviolet rays, visible light rays, infrared rays, X-rays, gamma rays, an electron beam, an ion beam, or the like. In particular, it would be preferable to use ultraviolet rays in terms of costs and the productivity of the three-dimensional shaped article.

Though not illustrated in the drawings, the apparatus 100 for manufacturing a three-dimensional shaped article may be one that is provided with a sacrificial layer removing means for removing the sacrificial layers 12, and a drying means for drying the three-dimensional shaped article 10 from which the sacrificial layers have been removed.

Examples of a sacrificial layer removing means include one that mechanically destroys and removes the sacrificial layers 12, a tank which holds the liquid as described above and in which the provisional molded article 10' is immersed, a liquid spraying means for spraying the liquid as described above toward the provisional molded article 10', a liquid coating means for coating the provisional molded article 10' with the liquid as described above, and so forth.

Examples of a drying means include one that supplies a heated gas or dried gas, as described above, or a pressure-reducing means that reduces the pressure of a space in which the three-dimensional shaped article 10 is held.

The apparatus for manufacturing a three-dimensional shaped article of the present invention need only perform at least a part of the steps described above, and a part of the steps described above may be performed without using the apparatus for manufacturing a three-dimensional shaped article.

According to the apparatus for manufacturing a three-dimensional shaped article of the present invention described above, a three-dimensional shaped article that has a glossy texture can be manufactured stably and efficiently. Also, the yield of the three-dimensional shaped article is improved and therefore the present invention is also advantageous in terms of reducing the costs of manufacturing the three-dimensional shaped article.

<<Ink Set>>

Next, the ink set of the present invention shall be described.

The ink set of the present invention comprises at least one kind of substantive section-forming ink 11' and at least one kind of sacrificial layer-forming ink 12'. The ink set of the present invention is one that is applied to the method of manufacturing a three-dimensional shaped article and apparatus for manufacturing a three-dimensional shaped article in the present invention as described above.

<Substantive Section-forming Ink>

The substantive section-forming ink 11' comprises at least a curable resin (curing component).

(Curable Resin)

Examples of the curable resin (curing component) include: a heat-curable resin; a variety of photocurable resins, such as a visible light-curable resin (a photocurable resin in the narrow sense) that is cured by light in the visible light range, an ultraviolet ray-curable resin, or an infrared ray-curable resin; an X-ray curable resin; and the like, from which one kind can be selected for use, or two or more kinds can be combined for use.

It is particularly preferable to use an ultraviolet ray-curable resin (polymerizable compound) in terms of the mechanical strength of the resulting three-dimensional shaped article 10, the productivity of the three-dimensional shaped article 10, the storage stability of the substantive section-forming ink 11', and so forth.

Preferably used as an ultraviolet ray-curable resin (polymerizable compound) is one with which an addition polymerization or ring-opening polymerization is initiated by radical species or cation species or the like produced from a photopolymerization initiator by irradiation with ultraviolet rays, thus creating a polymer. Manners of polymerization in addition polymerization include radical, cationic, anionic, metathesis, and coordination polymerization. Manners of polymerization in ring-opening polymerization include cationic, anionic, radical, metathesis, and coordination polymerization.

Examples of addition polymerizable compounds include compounds that have at least one ethylenically unsaturated double bond. Compounds that have at least one, preferably two terminal ethylenically unsaturated bonds can be preferably used as an addition polymerizable compound.

Ethylenically unsaturated polymerizable compounds have the chemical form of monofunctional polymerizable compounds and polyfunctional polymerizable compounds, or mixtures thereof.

Examples of monofunctional polymerizable compounds include unsaturated carboxylic acids (for example, acrylic acid, methacrylic acid, itaconic acid, crotonic acid, isocrotonic acid, maleic acid, and the like) or esters or amides thereof.

Polyfunctional polymerizable compounds includes esters of unsaturated carboxylic acids and aliphatic polyhydric alcohol compounds, and amides of unsaturated carboxylic acids and aliphatic amine compounds.

It would also be possible to use: a product of an addition reaction between an isocyanate or an epoxy and an unsaturated carboxylic acid ester or amide that has a nucleophilic substituent such as a hydroxyl group, an amino group, or a mercapto group; a product of a dehydration condensation reaction with a carboxylic acid; or the like. It would also be possible to use: the product of an addition reaction between an unsaturated carboxylic acid ester or amide having an electrophilic substituent group such as an isocyanate group or an epoxy group and an alcohol, amine, or thiol; or the product of a substitution reaction between an unsaturated carboxylic acid ester or amide having a leaving group substituent such as a halogen group or a tosyloxy group and an alcohol, amine, or thiol.

A (meth)acrylic acid ester is representative as a specific example of a radical polymerizable compound that is the ester of an unsaturated carboxylic acid and an aliphatic polyhydric alcohol compound; either a monofunctional one or a polyfunctional one could be used.

Specific examples of a monofunctional (meth)acrylate include: tolyloxyethyl(meth)acrylate, phenyloxyethyl(meth)acrylate, cyclohexyl(meth)acrylate, ethyl(meth)acrylate, methyl(meth)acrylate, isobornyl(meth)acrylate, dipropylene glycol di(meth)acrylate, tetrahydrofurfuryl(meth)acrylate, ethoxyethoxy ethyl(meth)acrylate, 2-(2-vinyloxyethoxy)ethyl(meth)acrylate, 2-hydroxy-3-phenoxypropyl(meth)acrylate, 4-hydroxybutyl(meth)acrylate, and the like.

Specific examples of bifunctional (meth)acrylates include ethylene glycol di(meth)acrylate, triethylene glycol di(meth)acrylate, 1,3-butanediol di(meth)acrylate, tetramethylene glycol di(meth)acrylate, propylene glycol di(meth)acrylate, neopentyl glycol di(meth)acrylate, hexanediol di(meth)acrylate, 1,4-cyclohexanediol di(meth)acrylate, tetraethylene glycol di(meth)acrylate, pentaerythritol di(meth)acrylate, and dipentaerythritol di(meth)acrylate.

Specific examples of trifunctional (meth)acrylates include trimethylol propane tri(meth)acrylate, trimethylol ethane tri(meth)acrylate, trimethylolpropane alkylene oxide-modified tri(meth)acrylate, pentaerythritol tri(meth)acrylate, dipentaerythritol tri(meth)acrylate, trimethylol propane tri((meth)acryloyloxypropyl) ether, isocyanuric acid alkylene oxide-modified tri(meth)acrylate, propionic acid dipentaerythritol tri(meth)acrylate, tri((meth)acryloyloxyethyl) isocyanurate, hydroxypivalaldehyde-modified dimethylol propane tri(meth)acrylate, and sorbitol tri(meth)acrylate.

Specific examples of tetrafunctional (meth)acrylates include pentaerythritol tetra(meth)acrylate, sorbitol tetra(meth)acrylate, ditrimethylol propane tetra(meth)acrylate, propionic acid dipentaerythritol tetra(meth)acrylate, and ethoxylated pentaerythritol tetra(meth)acrylate.

Specific examples of pentafunctional (meth)acrylates) include sorbitol penta(meth)acrylate, and dipentaerythritol penta(meth)acrylate.

Specific examples of hexafunctional (meth)acrylates include dipentaerythritol hexa(meth)acrylate, sorbitol hexa(meth)acrylate, phosphazene alkylene oxide-modified hexa(meth)acrylate, and captolactone-modified dipentaerythritol hexa(meth)acrylate.

Examples of polymerizable compounds other than (meth)acrylates include itaconic acid esters, crotonic acid esters, isocrotonic acid esters, and maleic acid esters.

Examples of itaconic acid esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of crotonic acid esters include ethylene glycol dicrotonate, tetramethylene glycol dicrotonate, pentaerythritol dicrotonate, and sorbitol tetradicrotonate.

Examples of isocrotonic acid esters include ethylene glycol diisocrotonate, pentaerythritol diisocrotonate, and sorbitol tetraisocrotonate.

Examples of maleic acid esters include ethylene glycol dimaleate, triethylene glycol dimaleate, pentaerythritol dimaleate, and sorbitol tetramaleate.

Examples of other esters that can be used also include: the aliphatic alcohol esters disclosed in Japanese Examined Patent Publication No. S46-27926, Japanese Examined Patent Publication No. S51-47334, and Japanese Unexamined Patent Publication No. S57-196231; those having an aromatic backbone disclosed in Japanese Unexamined Patent Publication No. S59-5240, Japanese Unexamined Patent Publication No. S59-5241, and Japanese Unexamined Patent Publication No. H2-226149; and the one containing an amino group disclosed in Japanese Unexamined Patent Publication No. H1-165613.

Specific examples of monomers of an amide of an unsaturated carboxylic acid and an aliphatic amine compound include methylene bis-acrylamide, methylene bismethacrylamide, 1,6-hexamethylene bis-acrylamide, 1,6-hexamethylene bismethacrylamide, diethylenetriamine trisacrylamide, xylylene bisacrylamide xylylene bismethacrylamide, and (meth)acryloylmorpholine.

Another example of a preferable amide monomer would be the one having a cyclohexylene structure disclosed in Japanese Examined Patent Publication No. 554-21726.

Urethane-based addition polymerizable compounds manufactured using an addition reaction between an isocyanate and a hydroxyl group are also favorable, and a specific example thereof could be a vinyl urethane compound containing two or more polymerizable vinyl groups in a molecule obtained by adding a vinyl monomer containing a hydroxyl group represented in formula (1) below to a polyisocyanate compound having two or more isocyanate groups in one molecule, as is disclosed in Japanese Examined Patent Publication No. S48-41708.

$$CH_2=C(R^1)COOCH_2CH(R^2)OH \qquad (1)$$

(where $R^1$ and $R^2$ in the formula (1) each independently indicate an H or $CH_3$)

In the present invention, a cationic ring-opening polymerizable compound having one or more cyclic ether groups such as an epoxy group or an oxetane group in the molecule can be favorably used as an ultraviolet ray-curable resin (polymerizable resin).

Examples of cationic polymerizable compounds include curable compounds comprising a ring-opening polymerizable group, among which heterocyclic group-containing curable compounds are particularly preferable. Examples of such curable compounds include an epoxy derivative, an oxetane derivative, a tetrahydrofuran derivative, a cyclic lactone derivative, a cyclic carbonate derivative, an oxazoline derivative, or other such cyclic imino ethers, or vinyl ethers; of these, epoxy derivatives, oxetane derivatives, and vinyl ethers are preferable.

Examples of preferable epoxy derivatives include monofunctional glycidyl ethers, polyfunctional glycidyl ethers, monofunctional alicyclic epoxies, and polyfunctional alicyclic epoxies.

Specific compounds for glycidyl ethers can be illustratively exemplified by diglycidyl ethers, (for example, ethylene glycol diglycidyl ether, bisphenol A diglycidyl ether, and the like), trifunctional or higher glycidyl ethers (for example, trimethylol ethane triglycidyl ether, trimethylol propane triglycidyl ether, glycerol triglycidyl ether, triglycidyl trishydroxyethyl isocyanurate, or the like), tetrafunctional or higher glycidyl ethers (for example, sorbitol tetraglycidyl ether, pentaerythritol tetraglycyl ether, cresol novolac resin polyglycidyl ether, phenolnovolac resin polyglycidyl ether, and the like), alicyclic epoxyies (for example, Celloxide 2021P, Celloxide 2081, Epolead GT-301, and Epolead GT-401 (Daicel Chemical Industries)), EHPE (Daicel Chemical Industries), phenol novolac resin polycyclohexyl epoxy methyl ether or the like), and oxetanes (for example, OX-SQ, PNOX-1009 (Toagosei), and the like).

As a polymerizable compound, an alicyclic epoxy derivative could be preferably used. An "alicyclic epoxy group" is a term for a moiety obtained when a double bond of a cycloalkene group such as a cyclopentene group or cyclohexene group is epoxidized with a suitable oxidizing agent such as hydrogen peroxide or a peroxy acid.

Preferable alicyclic epoxy compounds include polyfunctional alicyclic epoxies having two or more cyclohexene oxide groups or cyclopentene oxide groups in one molecule. Specific examples of alicyclic epoxy compounds include 4-vinylcyclohexene dioxide, (3,4-epoxycyclohexyl)methyl-3,4-epoxycyclohexyl carboxylate, di(3,4-epoxycyclohexyl) adipate, di(3,4-epoxycyclohexylmethyl) adipate, bis(2,3-epoxycyclopentyl) ether, di(2,3-epoxy-6-methylcyclohexylmethyl) adipate, and dicyclopentadiene dioxide.

A glycidyl compound having a normal epoxy group without an alicyclic structure in the molecule could be used either independently or in combination with an aforementioned alicyclic epoxy compound.

Examples of such normal glycidyl compounds could include glycidyl ether compounds and glycidyl ester compounds, but it is preferable to use a glycidyl ether compound in combination.

Specific examples of glycidyl ether compounds include: an aromatic glycidyl ether compound such as 1,3-bis(2,3-epoxypropyloxy)benzene, a bisphenol A epoxy resin, a bisphenol F epoxy resin, a phenol novolac epoxy resin, a cresol novolac epoxy resin, and a trisphenol methane epoxy resin; and an aliphatic glycidyl ether compound such as 1,4-butanediol glycidyl ether, glycerol triglycidyl ether, propylene glycol diglycidyl ether, and trimethylol propane tritriglycidyl ether. Examples of a glycidyl ester could include a glycidyl ester of linoleic acid dimers.

As a polymerizable compound, it would be possible to use a compound that has an oxetanyl group, which is a four-membered cyclic ether (this compound also being called simply an "oxetane compound" below). An oxetanyl group-containing compound is a compound that has one or more oxetanyl groups in one molecule.

Of the aforementioned curing components, the substantive section-forming ink 11' is particularly preferably one that comprises one or more species selected from the group consisting of 2-(2-vinyloxyethoxy)ethyl(meth)acrylate, a polyether-based aliphatic urethane(meth)acrylate oligomer, 2-hydroxy-3-phenoxypropyl(meth)acrylate, and 4-hydroxybutyl(meth)acrylate.

This makes it possible to cure the substantive section-forming ink 11' at a more appropriate speed of curing, causes the glossy outer appearance to be more reliably obtained in the three-dimensional shaped article 10, and makes it possible to provide the three-dimensional shaped article 10 with particularly excellent productivity.

The substantive section 11 that is formed by curing the substantive section-forming ink 11' can also be given particularly excellent mechanical strength and shape stability. As a result, the three-dimensional shaped article 10 can be given particularly excellent strength, durability, and reliability.

Comprising these curing components also makes it possible to give the cured product of the substantive section-forming ink 11' particularly low swellability and solubility with respect to a variety of solvents (for example, water and the like). As a result, the sacrificial layers 12 can be removed more reliably and at higher selectivity in the sacrificial layer removal step, and unintended deformation due to a defect being produced in the substantive section 11 or the like can be prevented. This results in the ability to more reliably give the three-dimensional shaped article 10 higher dimensional accuracy.

Also, because the cured product of the substantive section-forming ink 11' can be given lower swellability (solvent absorption), it is possible, for example, to omit or simplify a drying treatment serving as post-treatment after the sacrificial layer removal step. Because the solvent resistance of the three-dimensional shaped article 10 that is ultimately obtained is also improved, the three-dimensional shaped article 10 is given particularly high reliability.

In particular, when the substantive section-forming ink 11' comprises 2-(2-vinyloxyethoxy)ethyl(meth)acrylate, the substantive section-forming ink 11' is less susceptible to oxygen inhibition and can be cured at lower energy; also, copolymerization comprising other monomers can be promoted, and the three-dimensional shaped article 10 can be given particularly high strength.

When the substantive section-forming ink 11' comprises a polyether-based aliphatic urethane(meth)acrylate oligomer, the three-dimensional shaped article 10 can be given higher levels of both strength and toughness.

When the substantive section-forming ink 11' comprises 2-hydroxy-3-phenoxypropyl(meth)acrylate, the substantive section-forming ink 11' possesses flexibility and the elongation at break can be improved.

When the substantive section-forming ink 11' comprises 4-hydroxybutyl(meth)acrylate, then the adhesion to PMMA or PEMA particles, silica particles, metal particles, and the like is improved and the three-dimensional shaped article 10 can be given particularly high strength.

In a case where the substantive section-forming ink 11' comprises the aforementioned specific curing components (one or more species selected from the group consisting of 2-(2-vinyloxyethoxy)ethyl(meth)acrylate, polyether-based aliphatic urethane(meth)acrylate oligomer, 2-hydroxy-3-phenoxypropyl(meth)acrylate, and 4-hydroxybutyl(meth) acrylate), then the proportion of these specific curing components with respect to the total curing components constituting the substantive section-forming ink 11' is preferably 80 mass % or higher, more preferably 90 mass % or higher, even more preferably 100 mass %. This causes the above such effects to be more prominently exhibited.

The content ratio of the curing components in the substantive section-forming ink 11' is preferably 80 to 97 mass %, more preferably 85 to 95 mass %.

This makes it possible to impart particularly excellent mechanical strength to the three-dimensional shaped article 10 that is ultimately obtained. It is also possible to give the three-dimensional shaped article 10 particularly excellent productivity.

(Polymerization Initiator)

Preferably, the substantive section-forming ink 11' comprises a polymerization initiator.

This makes it possible to accelerate the speed of curing of the substantive section-forming ink 11' during the manufacture of the three-dimensional shaped article 10, and makes it possible to give the three-dimensional shaped article 10 particularly excellent productivity.

Examples of polymerization initiators that can be used include a photo-radical polymerization initiator (an aromatic ketone, acyl phosphine oxide compound, aromatic onium salt compound, organic peroxide, thio compound (a thioxanthone compound, a thiophenyl group-containing compound, or the like), a hexaaryl biimidazole compound, a ketoxime ester compound, a borate compound, an azinium compound, a metallocene compound, an active ester compound, a compound having a carbon-halogen bond, an alkylamine compound, or the like) or a photo-cationic polymerization initiator. Specific examples include acetophenone, acetophenonebenzylketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diamino-benzophenone, Michler's ketone, benzoin isopropyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholino-propan-1-one, bis-(2,4,6-trimethylbenzoyl)-phenyl-phosphine oxide, 2,4,6-trimethylbenzoyl-diphenyl-phosphineoxide, 2,4-diethylthioxantone, and bis-(2,6-dimethoxybenzoyl)-2,4,4-trimethylpentyl phosphineoxide, from which one species can be selected for use, or two or more species can be combined for use.

Of these, a preferable polymerization initiator constituting the substantive section-forming ink 11' is one that comprises bis(2,4,6-trimethylbenzoyl)-phenyl phosphoneoxide and/or 2,4,6-trimethylbenzoyl-diphenyl-phosphoneoxide.

Comprising such a polymerization initiator makes it possible to cure the substantive section-forming ink IP at a more appropriate speed of curing, causes the glossy outer appearance to be more reliably obtained in the three-dimensional shaped article 10, and makes it possible to give the three-dimensional shaped article 10 particularly excellent productivity.

The substantive section 11 that is formed by curing the substantive section-forming ink 11' can also be given particularly excellent mechanical strength and shape stability. As a result, the three-dimensional shaped article 10 can be given particularly excellent strength, durability, and reliability.

In particular, along with the sacrificial layer-forming ink 12', which shall be described below, when the substantive section-forming ink 11' comprises bis(2,4,6-trimethylbenzoyl)-phenyl phosphineoxide and (2,4,6-trimethylbenzoyl)-diphenyl phosphineoxide as a polymerization initiator, then the speeds of curing of the substantive section-forming ink 11' and the sacrificial layer-forming ink 12' can be more suitably controlled and the glossy outer appearance is even more reliably obtained in the three-dimensional shaped article 10. The three-dimensional shaped article 10 can also be given even more excellent productivity.

In a case where the substantive section-forming ink 11', along with the sacrificial layer-forming ink 12' described below, is one that comprises bis(2,4,6-trimethylbenzoyl)-phenyl phosphineoxide as a polymerization initiator, then the content ratio of the bis(2,4,6-trimethylbenzoyl)-phenyl phosphineoxide in the substantive section-forming ink 11' is preferably higher than the content ratio of the bis(2,4,6-trimethylbenzoyl)-phenyl phosphineoxide in the sacrificial layer-forming ink 12'.

This makes it possible to cure the substantive section-forming ink 11' and the sacrificial layer-forming ink 12' each at a more suitable speed, and causes the glossy outer appearance to be even more reliably obtained in the three-dimensional shaped article 10.

In a case where the substantive section-forming ink 11', along with the sacrificial layer-forming ink 12' described below, is one that comprises 2,4,6-trimethylbenzoyl-diphenyl phosphineoxide as a polymerization initiator, then the content ratio of the 2,4,6-trimethylbenzoyl-diphenyl phosphineoxide in the substantive section-forming ink 11' is preferably higher than the content ratio of the 2,4,6-trimethylbenzoyl-diphenyl phosphineoxide in the sacrificial layer-forming ink 12'.

This makes it possible to cure the substantive section-forming ink 11' and the sacrificial layer-forming ink 12' each at a more suitable speed, and causes the glossy outer appearance to be even more reliably obtained in the three-dimensional shaped article 10.

The content ratio of the polymerization initiator in the substantive section-forming ink 11' is not particularly limited but is preferably higher than the content ratio of the polymerization initiator in the sacrificial layer-forming ink 12'.

This makes it possible to cure the substantive section-forming ink 11' and the sacrificial layer-forming ink 12' each at a more suitable speed, and causes the glossy outer appearance to be even more reliably obtained in the three-dimensional shaped article 10.

Also, for example, adjusting the treatment conditions in the curing step makes it possible to give the sacrificial layers 12 a comparatively lower degree of polymerization even while giving the substantive section 11 an adequately high degree of curing after the end of the curing step. This results in making it possible to more easily remove the sacrificial layers 12 in the sacrificial layer removal step and making it possible to give the three-dimensional shaped article 10 particularly excellent productivity.

So doing is also preferable from the viewpoint of conserving energy, because there is no need to increase more than necessary the amount of energy rays to be irradiated.

In particular, where the content ratio of the polymerization initiator in the substantive section-forming ink 11' is $X_1$ [mass %] and the content ratio of the polymerization initiator in the sacrificial layer-forming ink 12' is $X_2$ [mass %], the relationship $1.05 \le X_1/X_2 \le 2.0$ is preferably satisfied; more preferably, the relationship $1.1 \le X_1/X_2 \le 1.5$ is satisfied.

This makes it possible for the substantive section-forming ink 11' and the sacrificial layer-forming ink 12' to each be cured at a more appropriate speed, causes the glossy outer appearance to be even more reliably obtained in the three-dimensional shaped article 10, and makes it possible to give the three-dimensional shaped article 10 even more excellent productivity.

As a specific value for the content ratio of the polymerization initiator in the substantive section-forming ink 11', 3.0 to 18 mass % is preferable; 5.0 to 15 mass % is even more preferable.

This makes it possible to cure the substantive section-forming ink 11' at a more appropriate speed of curing, causes the glossy outer appearance to be more reliably obtained in the three-dimensional shaped article 10, and makes it possible to provide the three-dimensional shaped article 10 with particularly excellent productivity.

The substantive section 11 that is formed by curing the substantive section-forming ink 11' can also be given particularly excellent mechanical strength and shape stability. As a result, the three-dimensional shaped article 10 can be given particularly excellent strength, durability, and reliability.

A preferred specific example of the blending ratio (an ink composition, which excludes "other components" described below) of the curable resin and polymerization initiator in the substantive section-forming ink 11' shall be illustrated below, but it shall be readily understood that the composition of the substantive section-forming ink in the present invention is in no way limited to what is described below.

BLENDING RATIO EXAMPLE 2-(2-vinyloxyethoxy) ethyl acrylate: 32 parts by mass
Polyether-based aliphatic urethane acrylate oligomer: 10 parts by mass
2-hydroxy-3-phenoxypropylacrylate 13.75 parts by mass
Dipropyleneglycol diacrylate: 15 parts by mass
4-hydroxybutylacrylate: 20 parts by mass
Bis(2,4,6-trimethylbenzoyl)phenylphoshine oxide: 5 parts by mass
2,4,6-trimethylbenzoyl diphenyl phosphone oxide: 4 parts by mass In a case of the above such formulation, the above such effects are more prominently exhibited.

(Other Components)

In addition, the substantive section-forming ink 11' may also comprise components other than those described above.

Examples of such components include a variety of coloring agents such as a pigment or dye; a dispersing agent; a surfactant; a sensitizer; a polymerization accelerator; a solvent; a penetration enhancer; a wetting agent (humectant); a fixing agent; an anti-fungal agent; a preservative; an antioxidant; an ultraviolet ray absorption agent; a chelating agent; a pH adjusting agent; a thickener; a filler; an aggregation inhibitor; an anti-foaming agent; and the like.

In particular, when the substantive section-forming ink 11' comprises a coloring agent, this makes it possible to obtain a three-dimensional shaped article 10 that has been colored to a color corresponding to the color of the coloring agent.

In particular, comprising a pigment as a coloring agent makes it possible to give the substantive section-forming ink 11' and the three-dimensional shaped article 10 favorable light resistance. For the pigment, it would be possible to use an inorganic pigment or an organic pigment.

Examples of inorganic pigments include: carbon blacks (C.I. Pigment Black 7) such as furnace black, lamp black, acetylene black and channel black; iron oxide, or titanium oxide; from which one kind can be selected for use, or two or more kinds can be combined for use.

Of these inorganic pigments, titanium oxide is preferable because of the preferable white color exhibited thereby.

Examples of inorganic pigments include: an azo pigment such as an insoluble azo pigment, a condensed azo pigment, azo lake, or chelate azo pigment; a polycyclic pigment such as a phthalocyanine pigment, a perylene or perynone pigment, an anthraquinone pigment, a quinacridone pigment, a dioxane pigment, a thioindigo pigment, an isoindolinone pigment, or a quinophthalone pigment; dye chelate (for example, a basic dye chelate or an acidic dye chelate, or the like); a color lake (a basic dye lake or an acidic dye lake); a nitro pigment; a nitroso pigment; aniline black; or a daylight fluorescent pigment; it would also be possible to use one species selected from these or a combination of two or more species selected from these.

More specifically, examples of carbon blacks that are used as pigments for the color black include: No. 2300, No. 900, MCF88, No. 33, No. 40, No. 45, No. 52, MA7, MA8, MA100, No. 2200B, and the like (Mitsubishi Chemical); Raven 5750, Raven 5250, Raven 5000, Raven 3500, Raven 1255, Raven 700, and the like (Carbon Columbia); Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (Cabot Japan); and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 (Degussa).

Examples of pigments for the color white include C.I. Pigment White 6, 8, and 21.

Examples of pigments for the color yellow include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of pigments for the color magenta include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, or C.I. Pigment Violet 19, 23, 32, 33, 36, 38, 43, and 50.

Examples of pigments for the color cyan include C.I. Pigment Blue 1, 2, 3, 15, 15:1, 15:2, 15:3, 15:34, 15:4, 16, 18, 22, 25, 60, 65, 66, and C.I. Vat Blue 4 and 60.

Examples of pigments other than those mentioned above include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

In a case where the substantive section-forming ink 11' comprises a pigment, then the mean particle size of the pigment is preferably 300 nm or smaller, more preferably 50 to 250 nm.

This makes it possible to give the substantive section-forming ink 11' particularly excellent discharge stability and to give the pigment in the substantive section-forming ink 11' particularly excellent dispersion stability, and makes it possible to form an image of more excellent image quality.

Examples of dyes include an acidic dye, a direct dye, a reactive dye, or a basic dye; it would also be possible to use one species selected from these or a combination of two or more species selected from these.

Specific examples of dyes include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

In a case where the substantive section-forming ink 11' comprises a coloring agent, then the content ratio of the coloring agent in the substantive section-forming ink 11' is preferably 1 to 20 mass %. This produces particularly excellent masking and color reproducibility.

In particular, in a case where the substantive section-forming ink 11' comprises titanium oxide as a coloring agent, then the content ratio of the titanium oxide in the substantive section-forming ink 11' is preferably 12 to 18 mass %, more preferably 14 to 16 mass %. This produces particularly excellent masking.

In a case where the substantive section-forming ink 11' comprises a pigment, then when a dispersing agent is also included, the dispersibility of the pigment can be further improved.

Though not particularly limited, examples of dispersing agents include dispersing agents that are commonly used to prepare pigment dispersions, such as polymeric dispersing agents.

Specific examples of polymeric dispersing agents include those composed mainly of one or more species from among polyoxyalkylene polyalkylene polyamine, vinyl-based polymers and copolymers, acrylic polymers and copolymers, polyester, polyamide, polyimide, polyurethane, amino-based polymers, silicon-containing polymers, sulfur-containing polymers, fluorine-containing polymers, and epoxy resins.

Examples of commercially available forms of polymeric dispersing agents include Ajinomoto Fine-Techno's Ajisper series, the Solsperse series (Solsperse 36000 and the like) available from Noveon, BYK's Disperbyk series, and Kusumoto Chemicals' Disparlon series.

When the substantive section-forming ink 11' comprises a surfactant, the abrasion resistance of the three-dimensional shaped article 10 can be further improved.

Though not particularly limited, examples of what can be used as a surfactant include polyester-modified silicone or polyether-modified silicone serving as a silicone-based surfactant; of these, it is preferable to use polyether-modified polydimethylsiloxane or polyester-modified polydimethylsiloxane.

Specific examples of surfactants include BYK-347, BYK-348, and BYK-UV 3500, 3510, 3530, and 3570 (which are trade names of BYK).

The substantive section-forming ink 11' may also comprise a solvent.

This makes it possible to suitably adjust the viscosity of the substantive section-forming ink 11', and makes it possible to give the substantive section-forming ink 11' particularly excellent stability of discharge by inkjet format even when the substantive section-forming ink 11' comprises high-viscosity components.

Examples of solvents include: (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, isopropyl acetate, n-butyl acetate, and isobutyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; and alcohols such as ethanol, propanol, and butanol; it would also be possible to use one species selected from these or a combination of two or more species selected from these.

The viscosity of the substantive section-forming ink 11' is preferably 10 to 30 mPa·s, more preferably 15 to 25 mPa·s.

This makes it possible to give the substantive section-forming ink 11' particularly excellent stability of discharge by inkjet. In the present specification, "viscosity" refers to a value measured at 25° C. using an E-type viscometer (Visconic ELD made by Tokyo Keiki).

A plurality of kinds of substantive section-forming ink 11' may be used in the manufacture of the three-dimensional shaped article 10.

For example, a substantive section-forming ink 11' (color ink) that comprises a coloring agent and a substantive section-forming ink 11' (clear ink) that does not comprise a coloring agent may both be used.

This makes it possible, for example, to use the substantive section-forming ink 11' that comprises the coloring agent as a substantive section-forming ink 11' applied to a region where the color tone is affected in terms of the outer appearance of the three-dimensional shaped article 10 and to use the substantive section-forming ink 11' that does not comprise a coloring agent as a substantive section-forming ink 11' applied to a region where the color tone is not affected in terms of the outer appearance of the three-dimensional shaped article 10, and is advantageous due in part to reducing the costs of producing the three-dimensional shaped article 10.

Also, a plurality of kinds of substantive section-forming ink 11' may be used in combination so as to provide a region (coating layer) formed using the substantive section-forming ink 11' that does not comprise a coloring agent on the outer surface of a region formed using the substantive section-forming ink 11' that does comprise a coloring agent, in the three-dimensional shaped article 10 that is ultimately obtained.

This makes it possible to more suitably render the glossy texture.

The substantive section 11 that comprises the coloring agent (in particular, pigment) is more brittle and prone to scratches, chipping, and the like than the substantive section 11 that does not comprise the coloring agent, but providing the region (coating layer) formed using the substantive section-forming ink 11' that does not comprise the coloring agent makes it possible to effectively prevent the occurrence of such problems.

Changes in the color tone of the three-dimensional shaped article 10 can also be effectively prevented and suppressed even in a case where long-term use of the three-dimensional shaped article 10 causes the surface to become worn.

Also, for example, a plurality of kinds of substantive section-forming ink 11' that comprise coloring agents of different compositions may be used.

This makes it possible to broaden the color reproduction range that can be rendered, using these combinations of substantive section-forming ink 11'.

In a case where a plurality of kinds of substantive section-forming ink 11' are used, it is preferable to use at least an indigo purple (cyan) substantive section-forming ink 11', a red purple (magenta) substantive section-forming ink 11', and a yellow substantive section-forming ink 11'.

This makes it possible to further broaden the color reproduction range that can be rendered, using these combinations of substantive section-forming ink 11'.

Combined use of a white substantive section-forming ink 11' with substantive section-forming inks 11' of other colors also produces the following effects.

Namely, the three-dimensional shaped article 10 that is ultimately obtained can be endowed with a first region to which the white substantive section-forming ink 11' is applied and a region (second region) to which a substantive section-forming ink 11' of that is colored (in particular, chromatic) a color other than white is applied, provided on the outer surface side from the first region. This makes it possible for the first region to which the white substantive section-forming ink 11' is applied to exhibit masking, and makes it possible to further raise the chroma of the three-dimensional shaped article 10.

Also, the aforementioned effect where the glossy texture is obtained and the effect where the chroma is increased act synergistically together, making it possible to give the three-dimensional shaped article 10 a particularly excellent aesthetic appearance (aesthetic).

<Sacrificial Layer-forming Ink>

The sacrificial layer-forming ink 12' comprises at least a curable resin (curing component).

(Curable Resin)

Examples of the curable resin (curing component) constituting the sacrificial layer-forming ink 12' include similar ones to those curable resins (curing components) illustratively exemplified as the constituent component of the substantive section-forming ink 11'.

In particular, the curable resin (curing component) constituting the sacrificial layer-forming ink 12' and the aforementioned curable resin (curing component) constituting the substantive section-forming ink 11' are preferably cured by the same kind of energy ray.

This makes it possible to effectively prevent the configuration of the apparatus for manufacturing a three-dimensional shaped article from becoming complicated, and makes it possible to give the three-dimensional shaped article 10 particularly excellent productivity. The surface shape of the three-dimensional shaped article 10 can also be more reliably controlled.

Of the variety of curing components, it is particularly preferable for the sacrificial layer-forming ink 12' to comprise 2-(2-vinyloxyethoxy)ethyl(meth)acrylate.

This makes it possible to cure the sacrificial layer-forming ink 12' at a more appropriate speed of curing, causes the glossy outer appearance to be more reliably obtained in the three-dimensional shaped article 10, and makes it possible to provide the three-dimensional shaped article 10 with particularly excellent productivity.

The sacrificial layers 12 that are formed by curing the sacrificial layer-forming ink 12' can also be given particularly excellent mechanical strength and stability of shape. As a result, during the manufacture of the three-dimensional shaped article 10, the sacrificial layer 12 of the lower layer (first layer) can more suitably support the substantive section-forming ink 11' for forming the upper layer (second layer). Therefore, unintended deformation (in particular, sagging and the like) of the substantive section 11 can be suitably prevented (the sacrificial layer 12 of the first layer functions as a support material), and the three-dimensional shaped article 10 that is ultimately obtained can be given particularly excellent dimensional accuracy.

The sacrificial layer-forming ink 12' also preferably comprises polyethylene glycol di(meth)acrylate, in addition to 2-(2-vinyloxyethoxy)ethyl(meth)acrylate.

This makes it possible to cure the sacrificial layer-forming ink 12' at an even more appropriate speed of curing, causes the glossy outer appearance to be more reliably obtained in the three-dimensional shaped article 10, and makes it possible to provide the three-dimensional shaped article 10 with particularly excellent productivity.

The sacrificial layers 12 that are formed by curing the sacrificial layer-forming ink 12' can also be given even more excellent mechanical strength and stability of shape. As a result, during the manufacture of the three-dimensional shaped article 10, the sacrificial layer 12 of the lower layer (first layer) can even more suitably support the substantive section-forming ink 11' for forming the upper layer (second layer). Therefore, unintended deformation (in particular, sagging and the like) of the substantive section 11 can be even more suitably prevented (the sacrificial layer 12 of the first layer functions as a support material), and the three-dimensional shaped article 10 that is ultimately obtained can be given even more excellent dimensional accuracy.

When the sacrificial layer-forming ink 12' comprises (meth)acryloylmorpholine, the following effects are obtained.

Namely, (meth)acryloylmorpholine is such that the solubility in a variety of solvents is high in a state (polymer of (meth)acryloylmorpholine in an incompletely cured state) where curing is not complete even in a case where the curing reaction has advanced. As such, the sacrificial layers 12 can be selectively, reliably, and efficiently removed even while defects are being more effectively prevented from occurring in the substantive section 11 in the aforementioned sacrificial layer removal step. As a result, the three-dimensional shaped article 10 of the desired form can be obtained at higher reliability and with favorable productivity.

When the sacrificial layer-forming ink 12' comprises one or more species selected from the group consisting of ethoxylated (3)trimethylolpropane triacrylate, tripropylene glycol diacrylate, and dipropylene glycol diacrylate, then the viscoelasticity of the sacrificial layers 12 is increased, and the glossy texture of the substantive section 11 surface is more effectively formed.

In a case where the sacrificial layer-forming ink 12' comprises 2-(2-vinyloxyethoxy)ethyl(meth)acrylate, then the content ratio of 2-(2-vinyloxyethoxy)ethyl(meth)acrylate in the sacrificial layer-forming ink 12' is preferably 20 to 50 mass %, more preferably 25 to 45 mass %, even more preferably 30 to 40 mass %. This causes the above such effects to be more prominently exhibited.

In a case where the sacrificial layer-forming ink 12' comprises polyethylene glycol di(meth)acrylate, then the content ratio of polyethylene glycol di(meth)acrylate in the sacrificial layer-forming ink 12' is preferably 40 to 70 mass %, more preferably 35 to 65 mass %, even more preferably 30 to 60 mass %. This causes the above such effects to be more prominently exhibited.

The ratio (($X_B/X_A \times 100$) of the content ratio $X_B$ [mass %] of polyethylene glycol di(meth)acrylate with respect to the content ratio $X_A$ [mass %] of 2-(2-vinyloxyethoxy)ethyl (meth)acrylate in the sacrificial layer-forming ink 12' is preferably 120 to 180%, more preferably 130 to 170%, even more preferably 140 to 165%. This causes the above such effects to be more prominently exhibited.

The content ratio of the curing component in the sacrificial layer-forming ink 12' is preferably 83 to 98.5 mass %, more preferably 87 to 95.4 mass %.

This makes it possible to endow the sacrificial layers 12 that are formed with particularly excellent shape stability, makes it possible to more effectively prevent the underlying layers 1 from experiencing unintended deformation in a case where the layers 1 have been stacked during the manufacture of the three-dimensional shaped article 10, and makes it possible to more suitably support the upper layer 1. As a result, the three-dimensional shaped article 10 that is ultimately obtained can be given particularly excellent dimensional accuracy. It is also possible to give the three-dimensional shaped article 10 particularly excellent productivity.

(Polymerization Initiator)

The sacrificial layer-forming ink 12' preferably comprises a polymerization initiator.

This makes it possible to appropriately increase the speed of curing of the sacrificial layer-forming ink 12' during the manufacture of the three-dimensional shaped article 10, and makes it possible to give the three-dimensional shaped article 10 particularly excellent productivity.

This also makes it possible to endow the sacrificial layers 12 that are formed with particularly excellent shape stability, makes it possible to more effectively prevent the underlying layers 1 from experiencing unintended deformation in a case where the layers 1 have been stacked during the manufacture of the three-dimensional shaped article 10, and makes it possible to more suitably support the upper layer 1. As a result, the three-dimensional shaped article 10 that is ultimately obtained can be given particularly excellent dimensional accuracy.

Examples of the polymerization initiator constituting the sacrificial layer-forming ink 12' are similar to the polymerization initiators illustratively exemplified as a constituent component of the substantive section-forming ink 11'.

In particular, it is preferable for the sacrificial layer-forming ink 12' to comprise bis(2,4,6-trimethylbenzoyl)-phenyl phosphineoxide and/or 2,4,6-trimethylbenzoyl-diphenyl-phosphineoxide as the polymerization initiator.

Comprising such a polymerization initiator makes it possible to cure the sacrificial layer-forming ink 12' at a more appropriate curing speed, causes the glossy outer appearance to be more reliably obtained in the three-dimensional shaped article 10, and makes it possible to give the three-dimensional shaped article 10 particularly excellent productivity.

The sacrificial layers 12 that are formed by curing the sacrificial layer-forming ink 12' can also be given particularly excellent mechanical strength and stability of shape. As a result, during the manufacture of the three-dimensional shaped article 10, the sacrificial layer 12 of the lower layer (first layer) can more suitably support the substantive section-forming ink 11' for forming the upper layer (second layer). Therefore, unintended deformation (in particular, sagging and the like) of the substantive section 11 can be suitably prevented (the sacrificial layer 12 of the first layer functions as a support material), and the three-dimensional shaped article 10 that is ultimately obtained can be given particularly excellent dimensional accuracy.

As a specific value for the content ratio of the polymerization initiator in the sacrificial layer-forming ink 12', 1.5 to 17 mass % is preferable; 4.6 to 13 mass % is even more preferable.

This makes it possible to cure the sacrificial layer-forming ink 12' at a more appropriate speed of curing, causes the glossy outer appearance to be more reliably obtained in the three-dimensional shaped article 10, and makes it possible to provide the three-dimensional shaped article 10 with particularly excellent productivity.

The sacrificial layers 12 that are formed by curing the sacrificial layer-forming ink 12' can also be given particularly excellent mechanical strength and stability of shape. As a result, during the manufacture of the three-dimensional shaped article 10, the sacrificial layer 12 of the lower layer (first layer) can more suitably support the substantive section-forming ink 11' for forming the upper layer (second layer). Therefore, unintended deformation (in particular, sagging and the like) of the substantive section 11 can be suitably prevented (the sacrificial layer 12 of the first layer functions as a support material), and the three-dimensional shaped article 10 that is ultimately obtained can be given particularly excellent dimensional accuracy.

A preferred specific example of the blending ratio (an ink composition, which excludes "other components" described below) of the curable resin and polymerization initiator in the sacrificial layer-forming ink 12' shall be illustrated below, but it shall be readily understood that the composition of the sacrificial layer-forming ink in the present invention is in no way limited to what is described below.

Blending Ratio Example 1

2-(2-vinyloxyethoxy) ethyl acrylate: 36 parts by mass
Polyethylene glycol (400) diacrylate: 55.75 parts by mass
Bis(2,4,6-trimethylbenzoyl)-phenyl phosphineoxide: 3 parts by mass
2,4,6-trimethylbenzoyl-diphenyl-phosphineoxide: 5 parts by mass In a case of the above such formulation, the above such effects are more prominently exhibited.

(Other Components)

In addition, the sacrificial layer-forming ink 12' may also comprise components other than those described above. Examples of such components include a variety of coloring agents such as a pigment or dye; a dispersing agent; a surfactant; a sensitizer; a polymerization accelerator; a solvent; a penetration enhancer; a wetting agent (humectant); a fixing agent; an anti-fungal agent; a preservative; an anti-oxidant; an ultraviolet ray absorption agent; a chelating agent; a pH adjusting agent; a thickener; a filler; an aggregation inhibitor; an anti-foaming agent; and the like.

In particular, when the sacrificial layer-forming ink 12' comprises a coloring agent, this improves the visibility of the sacrificial layers 12, making it possible to more reliably prevent at least a part of the sacrificial layers 12 from remaining in an unintended manner in the three-dimensional shaped article 10 that is ultimately obtained.

Examples of coloring agents constituting the sacrificial layer-forming ink 12' are similar to the coloring agents illustratively exemplified as a constituent component of the substantive section-forming ink 11', but the coloring agent is preferably a different color than the color (the color that is to be visible in terms of the outer appearance of the three-dimensional shaped article 10) of the substantive section 11, which overlaps with the sacrificial layers 12 formed by the sacrificial layer-forming ink 12' when observed from the normal direction of the surface of the three-dimensional shaped article 10. This causes the above such effects to be more prominently exhibited.

In a case where the sacrificial layer-forming ink 12' comprises a pigment, then when a dispersing agent is also included, the dispersibility of the pigment can be further improved. Examples of the dispersing agent constituting the sacrificial layer-forming ink 12' are similar to the dispersing agents illustratively exemplified as a constituent component of the substantive section-forming ink 11'.

The viscosity of the sacrificial layer-forming ink 12' is preferably 10 to 30 mPa·s, more preferably 15 to 25 mPa·s.

This makes it possible to give the sacrificial layer-forming ink 12' particularly excellent stability of discharge by inkjet.

A plurality of kinds of sacrificial layer-forming ink 12' may be used in the manufacture of the three-dimensional shaped article 10.

For example, two or more kinds of sacrificial layer-forming ink 12' that have mutually different viscoelasticities during curing of the substantive section-forming ink 11' can be used.

This makes it possible for the three-dimensional shaped article 10 that is ultimately obtained to have a plurality of regions at which the degree of glossiness is different. As a result, it becomes possible to render a more complex outer appearance, and the three-dimensional shaped article 10 can be given a particularly excellent aesthetic appearance (aesthetics), luxuriousness, and the like.

It is also conceivable, for example, to use two or more kinds of substantive section-forming ink 11' having each having a different viscoelasticity during curing in order to obtain such effects, but in such a case, there is the possibility that problems such as when the physical properties at each of the sites of the three-dimensional shaped article 10 that is ultimately obtained are different in an unintended manner could occur; by contrast, in a case where a plurality of kinds of sacrificial layer-forming ink 12' are used, it is possible to obtain the aforementioned effects even while reliably preventing the occurrence of such problems.

The ink set of the present invention need only be provided with at least one kind of substantive section-forming ink (first ink) 11' and at least one kind of sacrificial layer-forming ink (second ink) 12', but may also be provided with a third ink different therefrom.

Examples of the third ink include a sacrificial layer-forming ink not satisfying the aforementioned conditions. Being provided with such a third ink makes it possible to endow the three-dimensional shaped article 10 with a region exhibiting the glossy texture and a region exhibiting a texture other than glossy. As a result, it becomes possible to render a more complex outer appearance, and the three-dimensional shaped article 10 can be given a particularly excellent aesthetic appearance (aesthetics), luxuriousness, and the like.

According to the ink set of the present invention as described above, the three-dimensional shaped article having a glossy texture can be manufactured stably and efficiently. Also, the yield of the three-dimensional shaped article is improved and therefore the present invention is also advantageous in terms of reducing the costs of manufacturing the three-dimensional shaped article.

<<Three-dimensional Shaped Article>>

The three-dimensional shaped article of the present invention can be manufactured using the method of manufacture, apparatus for manufacturing a three-dimensional shaped article, and ink set as described above. This makes it possible to provide a three-dimensional shaped article having a glossy texture.

Use of the three-dimensional shaped article of the present invention is not particularly limited, but examples include an ornamental article or presented article such as a doll or figure, a medical device such as an implant, and the like.

The three-dimensional shaped article of the present invention may also be applied to prototypes, mass-produced goods, and custom-made goods.

The three-dimensional shaped article of the present invention may also be a model (for example, a model of (an automobile, a motorcycle, a boat, an airplane, or another such vehicle, a building, an animal, a plant, or another such living thing, a stone or another such natural (non-living) object, a variety of food products, and the like).

With a model, it is preferable to faithfully reproduce the texture and the like possessed by the original, but with a three-dimensional shaped article manufactured using a conventional lamination method, it has not been possible to respond sufficiently to such a need. By contrast, with the present invention, it is possible to suitable render a glossiness which has conventionally been especially difficult to render stably. As such, the effects of the present invention are more prominently exhibited in a case where the present invention is applied to a model.

A preferred embodiment of the present invention have been described above, but the present invention is in no way limited thereto.

For example, the embodiment described above centers on describing a case where the substantive section-forming ink and the sacrificial layer-forming ink are discharged by inkjet, but the substantive section-forming ink and the sacrificial layer-forming ink may be applied with another method (for example, another print method).

In the method of manufacture of the present invention, a pre-treatment step, an intermediate treatment step, and a post-treatment step may be carried out as needed.

Examples of the pre-treatment step include a step for cleaning the stage, and the like.

Examples of the post-treatment step include a washing step, a shape adjustment step for deburring and the like, an additional curing step for increasing the degree of curing of the curable resin constituting the substantive section, and the like.

An additional example of the post-treatment step may have a step for performing a mirror-finishing treatment (polishing treatment) for increasing the specularity (glossiness) of the three-dimensional shaped article. As described above, in the present invention, when the substantive section-forming ink and the sacrificial layer-forming ink satisfy a predetermined relationship as regards viscoelasticity, this makes it possible to endow the surface with a high degree of flatness; therefore, even in a case where such a post-treatment is performed, the post-treatment can be easily performed in a short period of time, and therefore the three-dimensional shaped article can be given excellent productivity. The effect from when the substantive section-forming ink and the sacrificial layer-forming ink satisfy a predetermined relationship as regards viscoelasticity and the effect from performing the post-treatment step act synergistically together, making it possible to obtain an excellent mirror-finished outer appearance that could not conventionally be achieved, even were the post-treatment step to be performed.

The present invention may also be applied to a powder lamination method (namely, a method for obtaining a three-dimensional shaped article in the form of a laminate having a plurality of layers to which a cured section is provided, by repeatedly carrying out a series of operations that are to use a powder to form a layer, and apply a curable ink to a predetermined site of the layer to form the cured section).

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A three-dimensional shaped article manufacturing method for manufacturing a three-dimensional shaped article by laminating layers formed by discharging and curing inks including a curable resin, the method comprising:
    applying a substantive section-forming ink to a region that forms the three-dimensional shaped article; and
    applying a sacrificial layer-forming ink for forming a sacrificial layer to a region that is adjacent to a region that forms an outermost layer of the three-dimensional shaped article and on a surface side of the outermost layer,
    a viscoelasticity of the sacrificial layer-forming ink during curing of the substantive section-forming ink being not less than a viscoelasticity of the substantive section-forming ink during curing of the substantive section-forming ink.

2. The three-dimensional shaped article manufacturing method as set forth in claim 1, further comprising
    removing the sacrificial layer from a provisional molded article obtained by curing the substantive section-forming ink and the sacrificial layer-forming ink.

3. The three-dimensional shaped article manufacturing method as set forth in claim 1, wherein
    the sacrificial layer-forming ink includes 2-(2-vinyloxyethoxy)ethyl (meth)acrylate.

4. The three-dimensional shaped article manufacturing method as set forth in claim 3, wherein
    the sacrificial layer-forming ink includes polyethylene glycol di(meth)acrylate, in addition to 2-(2-vinyloxyethoxy)ethyl(meth)acrylate.

5. The three-dimensional shaped article manufacturing method as set forth in claim 1, wherein
    the substantive section-forming ink includes one or more species selected from the group consisting of 2-(2-vinyloxyethoxy)ethyl(meth)acrylate, polyether-based aliphatic urethane (meth)acrylate oligomer, 2-hydroxy-3-phenoxypropyl(meth)acrylate, and 4-hydroxybutyl (meth)acrylate.

6. The three-dimensional shaped article manufacturing method as set forth in claim 1, wherein
    the substantive section-forming ink and the sacrificial layer-forming ink both include bis(2,4,6-trimethylbenzoyl)-phenyl phosphineoxide and/or 2,4,6-trimethylbenzoyl-diphenyl-phosphineoxide as a polymerization initiator.

7. The three-dimensional shaped article manufacturing method as set forth in claim 1, wherein
    a color ink containing a coloring agent and, in addition thereto, a colorless ink not containing a coloring agent are used as the substantive section-forming ink,
    the colorless ink being used upon formation of the region that forms the outermost layer, and the color ink being used upon formation of a region that is inside therefrom.

8. The three-dimensional shaped article manufacturing method as set forth in claim 1, wherein
    a chromatic color ink and a white ink are used as a color ink containing a coloring agent,
    the white ink being used upon formation of a region inside of a region formed using the chromatic color ink.

9. The three-dimensional shaped article manufacturing method as set forth in claim 1, wherein
    a plurality of different types of the sacrificial layer-forming ink are used.

10. The three-dimensional shaped article manufacturing method as set forth in claim 1, wherein
the sacrificial layer-forming ink is selectively applied only to a part of the region that is adjacent to the region that forms the outermost layer of the three-dimensional shaped article and on the surface side of the outermost layer.

* * * * *